Oct. 23, 1956 R. W. HUTTON 2,768,241

CROSSBAR-SWITCH SELECTOR SYSTEM

Filed Dec. 21, 1954 4 Sheets-Sheet 1

Oct. 23, 1956 R. W. HUTTON 2,768,241
CROSSBAR-SWITCH SELECTOR SYSTEM
Filed Dec. 21, 1954 4 Sheets-Sheet 2
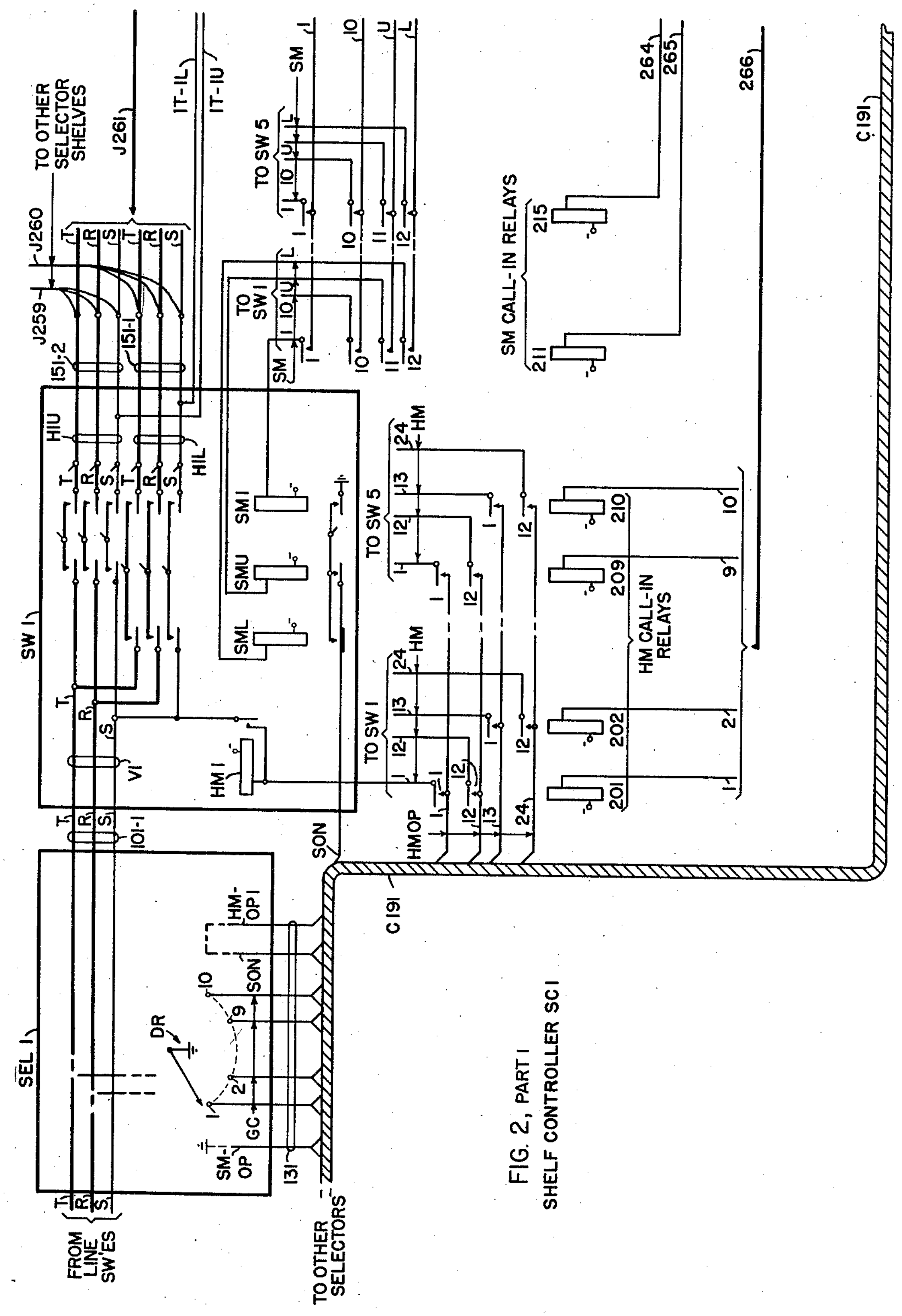
FIG. 2, PART I
SHELF CONTROLLER SC1

FIG. 2, PART 2
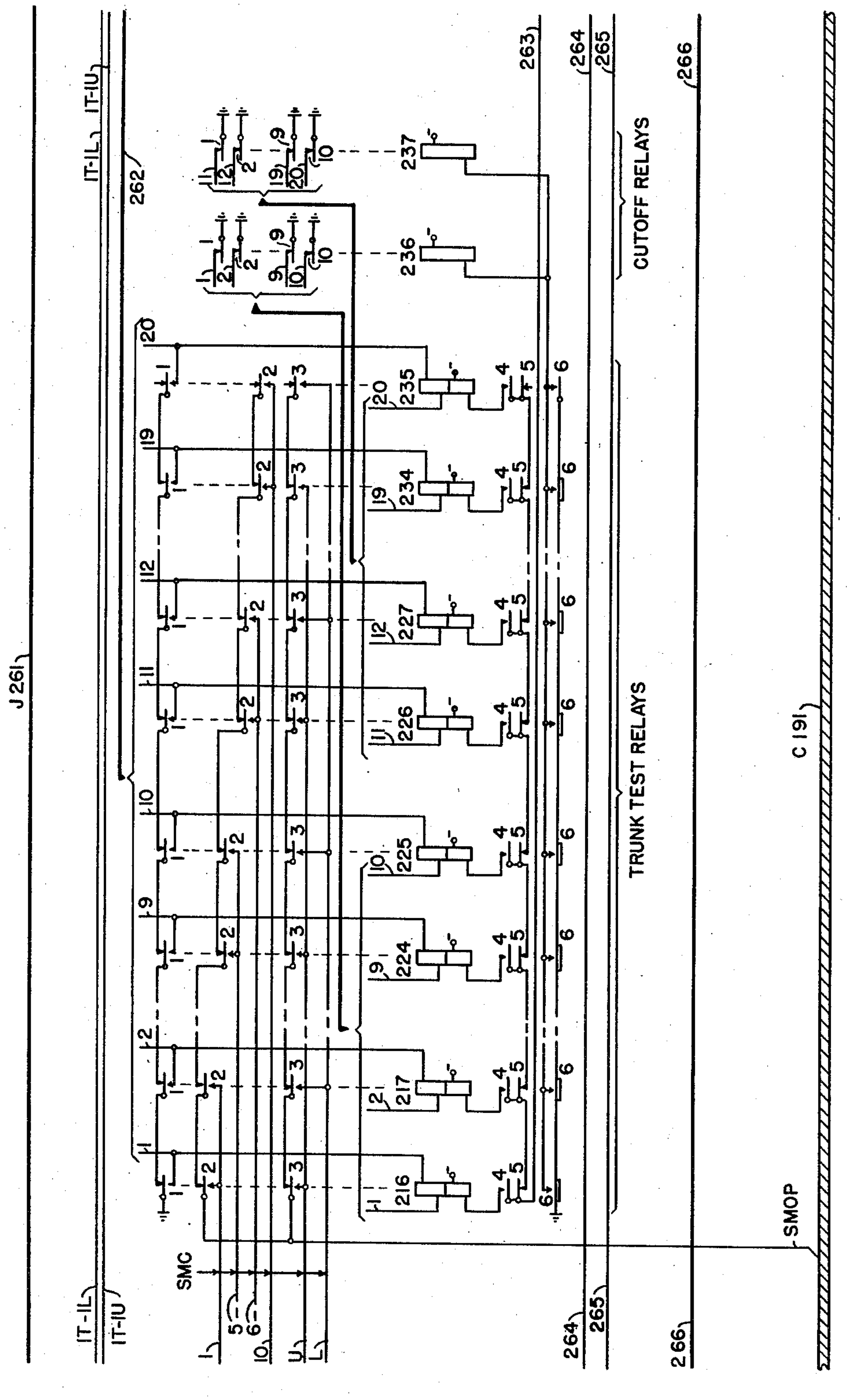

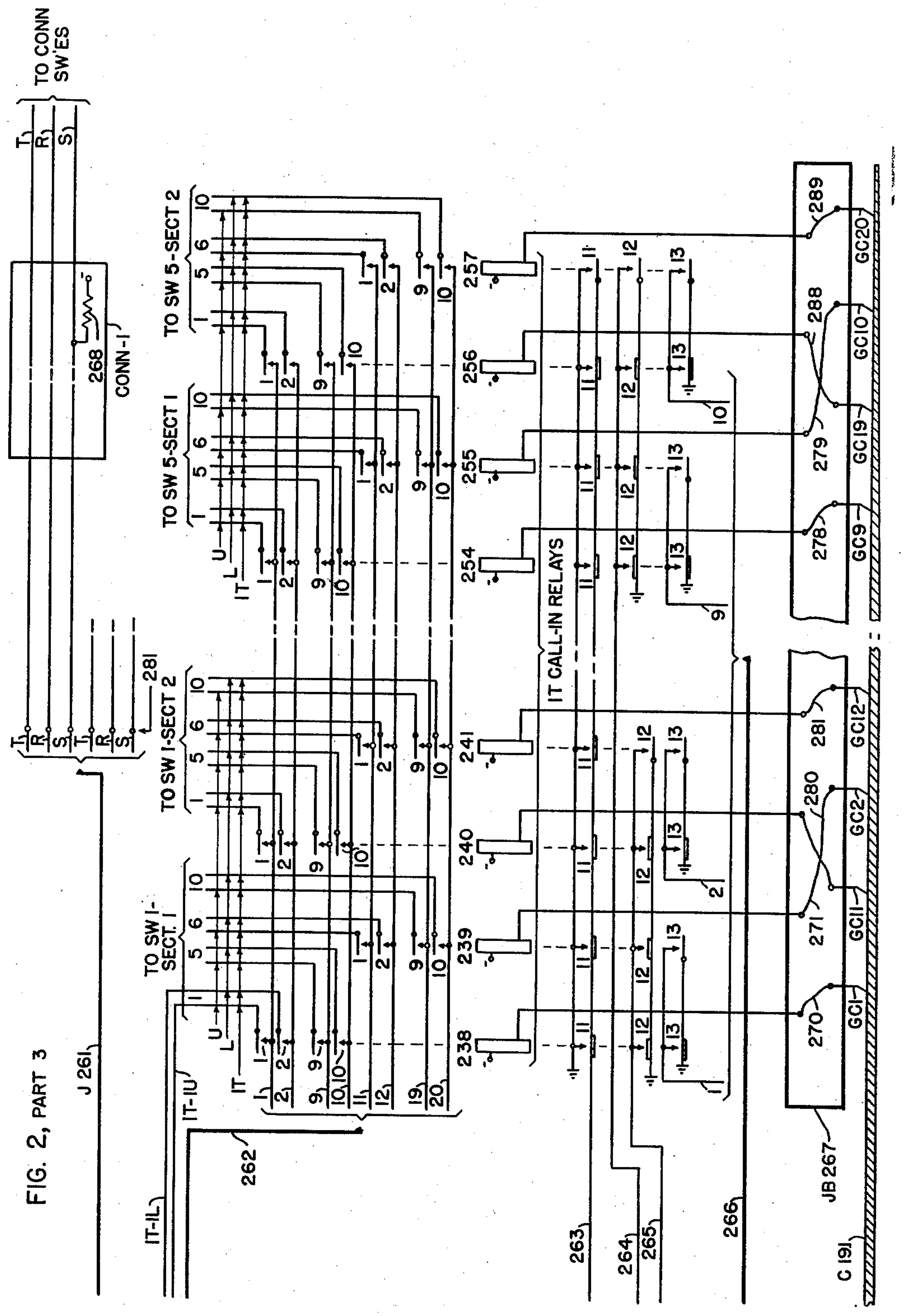
FIG. 2, PART 3

United States Patent Office 2,768,241

Patented Oct. 23, 1956

2,768,241

CROSSBAR-SWITCH SELECTOR SYSTEM

Robert W. Hutton, Chicago, Ill., assignor to International Telephone and Telegraph Corporation, New York, N. Y., a corporation of Maryland Application December 21, 1954, Serial No. 476,747

6 Claims. (Cl. 179—22)

This invention relates generally to a crossbar-switch selector system but is concerned more particularly with a selector system of that type wherein the trunks incoming to the selector stage are given direct access, as distinct from link access, to the trunks outgoing from the selector stage. Its principal object is to provide a new and improved switchboard arrangement of standaridized crossbar switches to comprise economical groups, or shelves, of selector switches which may be mounted in tiers or frames requiring a minimum of floor space.

In direct-access crossbar selector systems, as shown for example in the United States patent application of R. W. Hutton et al. for a Multi-Group Direct-Access Crossbar Telephone Switching System, Serial No. 359,761, filed June 5, 1953, it is common practice to employ a separate tier or shelf of standardized crossbar switches for each group of in-trunks to give them ten-trunk access to each of ten separately-designated numerical groups, or levels, of out-trunks. In the cited application, five crossbar switches may comprise a shelf serving a group of twelve in-trunks connected in common to the horizontals of all five switches. Each such switch accordingly has twelve horizontals, and each switch gives the twelve in-trunks ten-trunk access to each of two levels of out-trunks by having twenty verticals arranged in two selectable groups corresponding to respective levels of out-trunks.

The foregoing arrangement of cross bar switches for direct-access systems has been used satisfactorily in exchanges having ample floor space but due to the large number of shelves of switches required, has not been considered feasible in exchanges wherein floor space is at a premium.

According to the invention, advantage is taken of the known techniques of increasing the capacity of standardized crossbar switches, comprising (1) arranging each switch in two sections with separate verticals and horizontals, and (2) effectively doubling the horizontals of a section by arranging that each physical horizontal comprises two alternative trunk paths. Each section of a switch may then comprise twelve verticals each having access to twenty horizontal paths. By connecting in-trunks to the twelve verticals of such a section and connecting out-trunks to the twenty horizontal paths thereof, each section of such a two-section switch can be replace an entire switch of the cited application by giving twelve in-trunks ten-trunk access to each of two levels.

In a preferred embodiment, the first section of each of five switches of a shelf give a first group of twelve in-trunks ten-trunk access to the ten levels of out-trunks, with the second section of the five switches similarly serving a second group of twelve in-trunks.

In a second embodiment, the five sections comprising the first two and a half switches serve the first group of in-trunks, while the remaining sections of the shelf serve the second group of in-trunks.

The control over the switches of a shelf is preferably exercised by a shelf controller generally as disclosed in the cited application, but rearranged to preside over two groups of in-trunks and to control the testing, and the guiding of connections to, of twice as many groups of horizontal paths.

The above-mentioned and other features and objects of this invention and the manner of attaining them will become more apparent and the invention itself will be best understood, by reference to the following description of the invention taken in conjunction with the accompanying drawings comprising Figs. 1 to 3, wherein:

Fig. 2 shows in circuit diagram the esssential circuit details of the apparatus of Fig. 1.

GENERAL OPERATION

Figure 1:
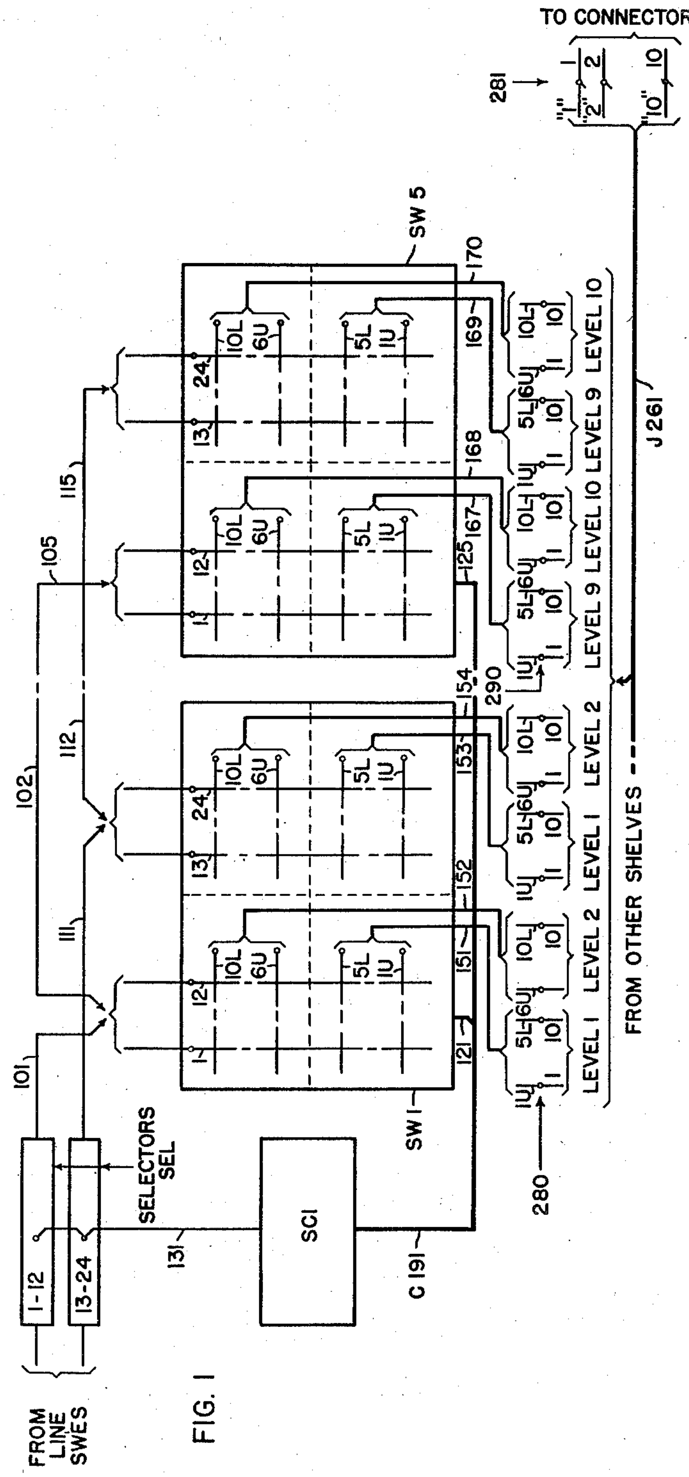
Fig. 1 shows diagrammatically the two-section switches and the associated apparatus of a selector shelf serving two groups of in-trunks according to the noted preferred embodiment.

Referring now to Fig. 1 of the drawings, a tier or shelf of selector switches and the asociated control apparatus is shown, comprising five two-section switches SW1 to SW5 of which only the first and last are shown; two groups of selector units SEL1 to SEL12 and SEL13 to SEL24; and an associated shelf controller SC1 common to switches SW1 to SW5. The switches of the disclosed shelf are shown arranged side by side but may be mounted one above another on a ten or twenty switch frame.

Each of the disclosed switches SW1 to SW5 is similar to those disclosed in United States Patent No. 2,577,067 issued December 4, 1951, to R. P. Arthur for a Crossbar Switch. In such a switch, it is well-known that severing the horizontal multiple between any two adjacent verticals provides two similar groups of horizontal multiples with each group having the original number of termination points and being accessible by a portion of the original number of verticals. The number of verticals having access to each horizontal multiple group being determined by the adjacent verticals selected as the point for severing the horizontal multiple.

In this disclosure, the horizontal multiple of a 25 x 20 switch (25 verticals and 20 horizontals) is severed between the twelfth and thirteenth verticals, thereby effectively providing two similar 12 x 20 switch sections.

Referring now to Fig. 1, it has been chosen to group the selector units into two groups of twelve selector units each, with the selector units of one group being connected to respective verticals 1 to 12 of the first section of each of the five switches and the selector units of the other group being connected to respective verticals 13 to 24 of the second section of each of such switches.

In any switch section, the twenty horizontals, comprising ten upper paths and ten lower paths, are divided into two groups of ten paths each and are assigned trunks in respective levels. For example, the first ten horizontal paths (upper and lower horizontals 1 to 5) of switch SW1 are assigned to respective trunks in the level 1 group of trunks and the second ten horizontals of the same section (upper and lower horizontals 6 to 10) are assigned to respective trunks in the level 2 groups of trunks. The twenty horizontals of section 1 of switch SW2 are connected to trunks in levels 3 and 4 and so forth with switch SW5 being associated with trunks in levels 9 and 10.

In Fig. 1, selectors SEL1 to SEL12 to comprise a first group of 12 selectors and are connected to respective verticals 1 to 12 of section 1 of switch SW1 by conductors in cable group 101, and are further multipled to respective verticals of section 1 of each of the switches SW2 to SW5 by conductors in cable groups 102 to 105, respectively. Selectors SEL13 to SEL25, comprising a second group of 12 selectors, are connected to respective verticals 13 to 24 of section 2 of each of the switches SW1 to SW5 by conductors in cable groups 111 to 115, respectively. Additionally, the trunks of the noted ten levels connected to the horizontals are grouped into respective groups by conductors in cable groups 151 to 170 and are terminated on an intermediate distributing frame by conductors in cable group J261.

The switches SW1 to SW5 are divided into two sections as noted, with the left-hand section being termed section 1 and the right-hand section being termed section 2. Horizontal pairs 1 to 5 are termed horizontal groups 1 or lower group of horizontals and horizontal pairs 6 to 10 are termed horizontal group 2 or the upper group of horizontals, respectively. Accordingly, as observed in Fig. 1, the level 1 trunks of section 1 of switch SW1 are terminated on the first or lower groups of horizontals of such section and the level 2 trunks thereof are terminated on the second or upper group of horizontals. The selectors SEL1 to SEL12 are termed selector group 1 or the first group and selectors SEL13 to SEL24 are termed selector group 2 or the second group of selectors. The following table shows the trunk level assignment to respective sections of respective switches and shows the selector groups having access thereto.

*Figure-1 table*

| Switch | | Section | | Group | | Level | |
|---|---|---|---|---|---|---|---|
| 1 | ------ | 1 | ------ | 1 | ------ | 1 | ------ |
| 1 | ------ | 1 | ------ | ------ | 2 | ------ | 2 |
| 1 | ------ | ------ | 2 | 1 | ------ | 1 | ------ |
| 1 | ------ | ------ | 2 | ------ | 2 | ------ | 2 |
| ------ | 2 | 1 | ------ | 1 | ------ | 3 | ------ |
| ------ | 2 | 1 | ------ | ------ | 2 | ------ | 4 |
| ------ | 2 | ------ | 2 | 1 | ------ | 3 | ------ |
| ------ | 2 | ------ | 2 | ------ | 2 | ------ | 4 |
| 3 | ------ | 1 | ------ | 1 | ------ | 5 | ------ |
| 3 | ------ | 1 | ------ | ------ | 2 | ------ | 6 |
| 3 | ------ | ------ | 2 | 1 | ------ | 5 | ------ |
| 3 | ------ | ------ | 2 | ------ | 2 | ------ | 6 |
| ------ | 4 | 1 | ------ | 1 | ------ | 7 | ------ |
| ------ | 4 | 1 | ------ | ------ | 2 | ------ | 8 |
| ------ | 4 | ------ | 2 | 1 | ------ | 7 | ------ |
| ------ | 4 | ------ | 2 | ------ | 2 | ------ | 8 |
| 5 | ------ | 1 | ------ | 1 | ------ | 9 | ------ |
| 5 | ------ | 1 | ------ | ------ | 2 | ------ | 10 |
| 5 | ------ | ------ | 2 | 1 | ------ | 9 | ------ |
| 5 | ------ | ------ | 2 | ------ | 2 | ------ | 10 |

In the foregoing table, the "Group" heading refers to the horizontal group and the numeral "1" refers to the first or lower group while the numeral "2" refers to the second or upper group of horizontals.

Cable J261 includes conductors from other selector shelves and are terminated on the intermediate distributing frame from whence they may be graded and multipled in the manner exemplified by United States Patent No. 1,633,118 issued June 21, 1927, to H. B. McElyea for a Bank and Trunk Cabling System.

A shelf controller CR1 is provided for each shelf of selectors and is associated with the switches therein by conductors in cable groups 121 to 124 and is also associated with the two groups of selectors by conductors in cable group 131.

Responsive to the well-known extension of a connection from a calling line through the associated line switch to an idle selector, the concerned selector records an indication of the level called and calls-in the shelf controller over conductors in cable 131. As is usual in a system having common control equipment, the shelf controller is individualized with the calling selector and responds to the recorded information to control the switch and switch section serving the called level to make connection with an idle trunk in the called level. The detailed operation of the shelf controller in controlling the switches SW1 to SW5 will be described hereinafter. Responsive to the connection of the calling selector with an idle trunk in the called level, the shelf controller is returned to common use in preparation for handling calls from other selectors.

DETAILED DESCRIPTION

Referring now to Fig. 2 of the drawings, a detailed description of shelf controller SC1, in controlling switches SW1 to SW5 in extending connections from calling ones of the two groups of twelve selectors to idle trunks in a called level of trunks, will now be given.

Fig. 2, parts 1 to 3, discloses a fragmentary circuit diagram of a selector SEL1 connected by tip, ring and sleeve conductors T, R, and S of cable 101–1 to vertical V1 of crossbar switch SW1 and connected by conductors in cable group 131 to cable C191 extending to shelf controller SC1. The shelf controller SC1, common to both selector groups, is shown in circuit detail and is arranged to respond to control from any selector of the noted groups to control switches SW1 to SW5 to extend a connection from a calling selector to an idle connector, such as connector CONN–1, by way of an idle trunk.

The 57 relays of shelf controller SC1 has principal functions assigned thereto as follows:

Relays 201 to 210 (hold-magnet call-in relays) are grouped into five groups of two relays each, with each group being associated with a crossbar switch of the selector shelf to control the operate leads of the hold magnets therein, the relays of each group corresponding respectively to the sections of the associated switch;

Relays 211 to 215 (select-magnet call-in relays) are associated respectively with the five switches of the shelf, and when operated, associate the operate windings of the select magnets (10 principal and 2 extensions) to the shelf controller;

Relays 216 to 235 (trunk-test relays) corespond respectively to the 20 trunks serving a switch section. Relays 216 to 225 are associated with the first group or lower group of horizontal paths and relays 226 to 235 are associated with the second group of horizontals. These relays operate to determine the busy or idle condition of such trunks connected to associated horizontals;

Relays 236 and 237 (cutoff relays) are connected in parallel and operate to disable the testing circuit of the trunks responsive to the selection of an idle one in the called group; and Relays 238 to 257 (idle-test call-in relays) are grouped into five groups of four relays each, with each group of four relays being associated with a separate switch. The first relay of each group call-in the trunks associated with the first or lower group of horizontals of the first section of its associated switch; the second relay corresponds to the upper group of horizontals of the same section; the third relay corresponds to the lower horizontals of the second section of its associated switch, and so forth. These relays accordingly cooperate with the trunk-test relays in selecting an idle trunk in the called numerical group or level.

Responsive to a calling condition on the trunk extending to selector SEL1, by the closure of the calling loop across the tip and ring conductors incoming thereto, the calling subscriber dials the digit corresponding to the level of trunks desired, such digit being recorded in selector SEL1.

For purposes of clarity, it has been chosen to assign the digits of the called number to respective levels, that is, level 1 corresponds to the digit 1 and so forth.

In the well-known manner, a digit register DR is advanced across the bank wires of the register in accordance with the value of the digit dialed and becomes positioned on the wire corresponding to the recorded digit. Following such dialing, selector SEL1, by circuit details not shown, becomes individualized with shelf controller SC1. At the same time, as indicated in the drawings, the control wire SMOP is grounded and the control wires SON and HMOP1 are connected together.

For purposes of illustration, it has been chosen to assume the digit 1 to be dialed in selector SEL1 and group control wire GC1 to be grounded by the operation of the digit register DR.

Referring in particular to selector SEL1, it being a selector in the first selector group, it will be observed that the group control wires GC1 to GC10, corresponding to digits 1 to 0, are multipled as indicated. This multipling, however, is among the selectors of its associated group, selectors SEL2 to SEL12. Another set of group control wires GC11 to GC24, corresponding respectively to digit 1 to 0, are provided for the selectors SEL13 to SEL24 and are separate from the group control wires of the first group of selectors. This is illustrated in the lower portion of Fig. 2, part 3, where the two sets of control wires are connected to jumper board JB267.

Ground on the group control wire GC1 is extended over the group control wire in cable C191 to the jumper board JB267 of controller SC1.

Referring now to jumper board JB267, it will be observed that two sets of group control wires are terminated thereon, these two groups comprising group control wires GC1 to GC10 and GC11 to GC20, as previously noted. With the twenty idle-test call-in relays being grouped into five groups of four relays each, as previously noted, and with each relay of a group being associated with a separate set of ten horizontals which respectively terminate trunks of associated levels, the group control wire grounded responsive to the calling of a desired level must be connected to the idle-test relay associated with the trunks in the called level which are accessible by the calling selector group. In accordance with the Fig. 1 table, group control wire GC1, corresponding to the trunk level 1 served by the lower group of horizontals of section 1 of switch SW1 is connected by jumper 270 to idle-test relay 238, such relay being associated with the lower group of horizontals of the first section of switch SW1.

Likewise, group control wire GC2 corresponding to the called digit 2 and trunk level 2, is jumpered by means of jumper 271 to the battery-connected winding of relay 239, to call-in for test the trunks connected to the upper group of horizontals of section 1 of switch 1 responsive to dialing of level 2 trunks.

Responsive to a call from the second group of selectors, the corresponding one of the group control wires GC11 to GC20 is grounded in accordance with the digit dialed and the group control wires are jumpered to the associated call-in relay in a similar manner. Accordingly, group control wire GC11, corresponding to the digit 1 and level 1, is jumpered by jumper 280 to the battery-connected winding of idle-test call-in relay 240 to call-in for test the trunks connected to the lower group of horizontals of section 2 of switch SW1, such trunks being accessible by the second group of selectors.

Responsive to the grounding of group-control wire GC1 as hereinbefore noted, idle test call-in relay 238 operates and at its contacts 1 to 10 calls-in the sleeve wires of the trunks associated with such horizontals. These sleeve extension wires are extended over corresponding conductors 1 to 10 in cable group 262 to the upper winding of respective trunk-test relays 216 to 225 of Fig. 2, part 2.

In the event that group control wire GC2 was grounded, relay 239 would operate and connect the sleeve extension wires associated with the level 2 trunks to the upper winding of respective trunk test relays 226 to 235.

Ground potential from contacts 1 to 10 of each of the cutoff relays 236 and 237 appears on the others side of the upper winding of each trunk test relay, completing an operate circuit for the test relays associated with the idle trunks and shunting such winding of the relays associated with busy trunks.

Assuming the first five trunks extending to the connectors such as connector CONN–1, to be idle, and the remaining five trunks in the called level to be busy, idle-indicating battery potential appearing on the sleeves of the idle trunks, such as from resistor 268 of connector CONN-1, appears on one side of the upper winding of the first five relays of relays 216 to 225 and ground potential on the sleeves of the busy trunks appear on the upper winding of the last five relays of that group.

The trunk-test relays 216 to 220 (relays 218, 219 and 220 not shown) being associated with idle trunks, operate and the first relay 216 at its make contacts 1 places a busy marking condition on associated trunk, marking it busy. Each of the five operated relays at their make first contacts 4 tries to lock operated to ground potential on wire 263, grounded at contacts 11 of relay 238. Since relay 216 has the operating preference as determined by its contacts 5, it is the only relay to lock operated as its contacts 5 disconnects locking ground from the remainder of the relays.

Make contacts 6 of the operated trunk-test relay 216 extends ground potential to the battery-connected winding of relays 236 and 237 causing them to operate and remove ground potential from one side of the test winding of all the trunk-test relays, permitting all relays to restore, except the one locked operated through its make contacts 4.

Responsive to the hereinbefore described operation of idle test call-in relay 238, make contacts 12 and 13 thereon extend ground potential over wire 265 and over conductor 1 of cable 266 to the battery-connected winding of select magnet call-in relay 211 and to the battery-connected winding of hold magnet call-in relay 201. Relays 201 and 211 thereupon operate.

At such time, idle-test call-in relay 238, trunk-test relay 216, cutoff relays 236 and 237, select magnet call-in relay 211, and hold magnet call-in relay 201 are operated.

As noted, the hold magnet call-in relays select the switch section to which the calling selector is associated, the select magnet call-in relays select the switch containing the horizontals serving the called level; and the idle-test call-in relay selects the group of horizontals serving such level. From these three relays, the shelf controller is individualized with the switch, the switch section and the horizontal group containing the called trunk level. For complete selection, the controller has yet to identify an idle trunk in such level.

Referring now in particular to the trunk test relays, it will be observed that each pair of relays is associated with a separate select magnet control wire, and that each relay of a pair is associated with a separate extension magnet wire.

Accordingly, each of the test trunk relays when operated, performs a dual purpose by identifying the horizontal pair corresponding to the selected idle trunk and by selecting the upper or lower path corresponding thereto. With such information, the shelf controller SC1 is prepared to operate the switch to effect the extension of a connection from a calling selector to an idle trunk in a called level.

Responsive to the operation of trunk-test relay 216, the ground on select magnet operate wire SMOP is extended through make contacts 2 and 3 to the select magnet control wires SMC1 and SMCU. This ground is extended through contacts 1 and 11 of relay 211 to the battery-connected winding of principal select magnet SM1 and the winding of extension select magnet SMU of switch SW1, as determined by the operation of relay 211.

Select magnets SMU and SM1 operate and at their off-normal contacts, ground the secondary off-normal wire SON and mechanically selects the horizontal pair and the upper and lower horizontal therein corresponding to the selected trunk.

As hereinbefore noted, the secondary off-normal wire SON is connected to the hold magnet operate wire HMOP, such hold magnet operate wire being individual to selector SEL1, and the ground thereon now appears on the hold magnet operate wire HMOP1.

Responsive to the hereinbefore noted operation of the hold magnet call-in relay 201, its make contacts 1 extend the ground on the hold magnet operate wire HMOP1 to the associated hold magnet HM1 of the switch SW1 to cause the hold magnet therein to operate, thereby connecting the tip, ring, and sleeve conductors of selector SEL1 to respective tip, ring, and sleeve conductors of the selected trunk connected to connector CONN–1. The operate ground on the hold magnet HM1 is extended through its off-normal contacts to the sleeve conductor S of the selected trunk to operate the usual switch-through relay (not shown) in selector SEL1 and to project a ground forward to maintain the selected trunk busy to other calls to trunks in that level.

At such time, responsive to the operation of the cut-through relay of the selector, ground is removed from the digit wires, and from the select magnet operate wire SMOP, and the connection between the secondary off-normal wire SON and the hold magnet operate wire HMOP1 is opened, thereby permitting the idle test call-in relays and the select magnets to restore. Responsive to the restoration of the idle-test relay, the operated trunk-test relays, the operated hold-magnet call-in relay and the operated select-magnet call-in relays are restored, returning the shelf controller SC1 to common use again.

At such time the connection from the calling selector SEL1 to the idle connector CONN–1 associated with the selected trunk is complete and the calling subscriber dials the remaining digits of the directory number in the usual manner to extend a connection to the called line.

Referring again to the idle-test call-in relays 238 to 257, the operation of shelf controller SC1 has been described with reference to the trunk levels comprising ten trunks. Shelf controller SC1 may be arranged for handling twenty trunks in a group such as might arise in the event that the twenty trunks connected to the horizontals of either sections of a switch may be grouped in one level. In such an arrangement, the group control wire associated with the called level would be jumpered to two idle test call-in relays, each relay calling-in ten trunks.

For example, assuming section 1 of switch SW1 serves twenty trunks in level 1, the group control wire GC1, corresponding to level 1 would be jumpered to idle-test call-in relays 238 and 239. In such an event, all twenty trunk-test relays 216 to 235 would simultaneously test the associated trunks.

SECOND EMBODIMENT

Figure 3:
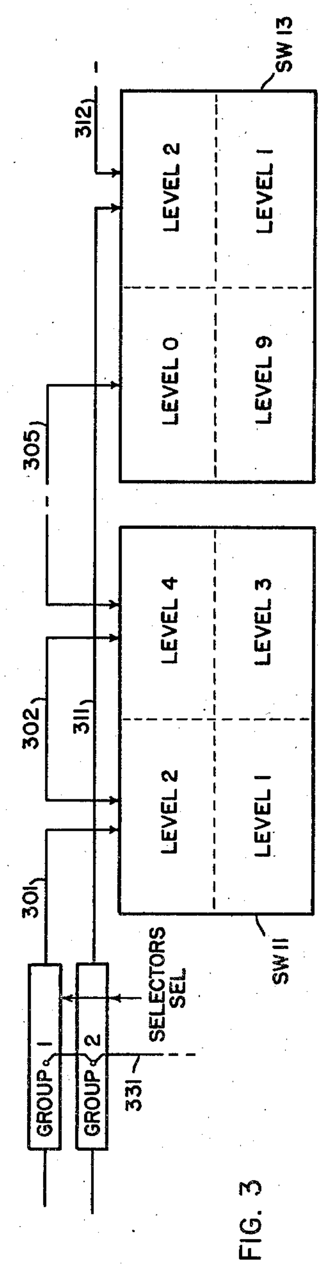
Fig. 3 shows the apparatus of Fig. 1 arranged according to the noted second embodiment of the invention.

Referring now to Fig. 3 of the drawings, a second embodiment of the invention will be described.

In Fig. 3, switches SW11 and SW13, comparable to switches SW1 to SW3 of Fig. 1, are shown in block diagrams with the groups of horizontals of each section being indicated as levels. For example, the lower horizontal group of section 1 of switch SW1 is designated level 1, the upper group being designated level 2, and so forth.

The purpose of this embodiment is to illustrate another of the numerous ways in which the selector groups might be assigned to the various switch sections and in which the trunk levels might be grouped.

In Fig. 3, the first group of selectors, selectors SEL1 to SEL12, are connected to the verticals of the five sections of the first two and one half switches by conductors in cables 301 to 305 and the second group of selectors, selectors SEL13 to SEL24, are connected to the verticals of the five sections of the remaining switches by conductors in cables 311 to 315, cables 313 to 315 not shown.

Shelf controller SC1 is arranged to handle the rearranged selector groups by the assignment of group control wires to associated idle-test call-in relays so that the trunks called-in correspond to the level called, in a manner similar to that described with reference to the first embodiment of the invention.

I claim:

1. In a switching system, selector switching apparatus for connecting calling ones of a number of in-trunks respectively to idle trunks in respectively called groups of out-trunks, said switching apparatus comprising a group of crossbar switches each including two sections and having select magnets common to both sections, each section including a separate group of horizontal multiples corresponding respectively to the common select magnets and including a set of vertical multiples intersecting the associated horizontal multiples, each section further including hold magnets and associated crosspoint means for connecting any horizontal multiple of the section to any vertical multiple thereof under the joint control of the hold magnets of the section and the common select magnets, a group of in-trunks comprising trunks connected respectively to verticals of each of a selected number of the said sections, the group of horizontal multiples of any last said section comprising subgroups, the groups of out-trunks comprising separately designated numerical groups, or levels, each said subgroup of horizontal multiples being assigned to a separate said level, wiring means connecting trunks of any said level to respective horizontal multiples in the said subgroup of horizontal multiples assigned to such level, means controlled over any calling one of the in-trunks in the said group thereof for designating any said level as a called level, means responsive thereto for selecting an idle trunk of the called level appearing in the corresponding assigned one of said subgroups of horizontal multiples, means for controlling the select magnets of the switch containing the section in which the last said subgroup of horizontal multiples is located to select the horizontal multiple therein to which the said selected trunk is connected, means for operating a hold magnet of the last said section to control associated crosspoint means to connect the calling in-trunk to the said selected out-trunk in the called group by way of the said selected horizontal multiple.

2. A switching system according to claim 1, wherein the said two sections of at least one crossbar switch terminate separate respective groups of in-trunks, whereby that switch provides two outlet levels for each of two groups of in-trunks.

3. A switching system according to claim 1, wherein the said two sections of each crossbar switch of a group terminate separate respective groups of in-trunks, whereby each such switch provides two outlet levels for each of two groups of in-trunks.

4. A switching system according to claim 1, wherein the two sections of at least one said crossbar switch terminate separate respective groups of in-trunks, and wherein the two sections of any other said crossbar switch each terminates a single group of in-trunks and provides that group with access to four levels of out-trunks.

5. A switching system according to claim 1, wherein the two sections of any said crossbar switch terminate the same group of in-trunks and provides that group with access to four levels of out-trunks.

6. In a switching system according to claim 1, wherein at least one section not included in the said selected number of sections has its horizontal multiples in one large group corersponding to a single level of out-trunks, means responsive to the designation of the last said level for selecting an idle trunk connected to any last said horizontal multiple, and means for operating a hold magnet of the last said section to control associated crosspoint means to connect the calling in-trunk to the said selected out-trunk in the called group by way of the said selected horizontal multiple.

No references cited.